United States Patent
Shatdarshanam Venkata et al.

(10) Patent No.: US 10,938,625 B2
(45) Date of Patent: Mar. 2, 2021

(54) STANDBY CONTROLLERS FOR ACCESS POINTS

(71) Applicant: Hewlett Packard Enterprise Development LP, Houston, TX (US)

(72) Inventors: Sree Vasthav Shatdarshanam Venkata, Bangalore (IN); Srinivas Killadi, Bangalore (IN); Chanakya Challagolla, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 15/884,987

(22) Filed: Jan. 31, 2018

(65) Prior Publication Data
US 2019/0239288 A1    Aug. 1, 2019

(51) Int. Cl.
*H04L 12/24* (2006.01)
*H04W 88/12* (2009.01)
*H04W 8/06* (2009.01)
*H04W 28/16* (2009.01)
*H04B 1/74* (2006.01)
*H04W 24/04* (2009.01)

(52) U.S. Cl.
CPC ........... *H04L 41/0663* (2013.01); *H04B 1/74* (2013.01); *H04W 8/06* (2013.01); *H04W 28/16* (2013.01); *H04W 88/12* (2013.01); *H04L 41/0846* (2013.01); *H04W 24/04* (2013.01)

(58) Field of Classification Search
CPC ........................... H04W 24/04; H04L 41/0663
See application file for complete search history.

(56) References Cited

U.S. PATENT DOCUMENTS

| | | | |
|---|---|---|---|
| 8,824,448 B1 | 9/2014 | Narayana et al. | |
| 9,306,801 B2 | 4/2016 | Yang et al. | |
| 9,654,991 B2 | 5/2017 | Yang et al. | |
| 2008/0096503 A1 | 4/2008 | Economy et al. | |
| 2015/0312140 A1* | 10/2015 | Yang | H04L 12/1863 370/218 |
| 2016/0227473 A1* | 8/2016 | Bhanage | H04W 16/00 |
| 2016/0323781 A1* | 11/2016 | Yang | H04W 24/02 |

OTHER PUBLICATIONS

Aruba, ArubaOS 8.0.1.0 Command-Line Interface, Reference Guide, Nov. 14, 2016, 43 Pgs.

* cited by examiner

*Primary Examiner* — Joseph A Bednash
(74) *Attorney, Agent, or Firm* — Brooks, Cameron & Huebsch, PLLC (57) ABSTRACT

Example implementations relate to standby controllers for access points (APs). A network controller may comprise a processing resource; and a memory resource storing machine-readable instructions to cause the processing resource to: determine, in response to a first controller in a controller cluster failing, whether a first AP managed by a first controller has been assigned to a standby controller; determine, in response to the first AP managed by the first controller not having a standby controller assigned, a radio frequency (RF) gap as a result of a different controller failing; and based on the size of the RF gap, assign the second controller as a standby controller for the first AP.

20 Claims, 6 Drawing Sheets

STANDBY CONTROLLERS FOR ACCESS POINTS

BACKGROUND

In some computing networks, access points (APs) may provide network connectivity to client devices. These APs may be associated with controllers. The APs and the controllers may work in coalition to provide redundancy in an event that one of the APs and/or one of the controllers fails. For example, if one controller fails, another controller may provide network connectivity to a client device so that the client device does not experience an interruption in network connectivity.

DETAILED DESCRIPTION

In a computing network, APs can provide network connectivity to client devices associated with the APs. The APs of the computing network can be assigned to various types of controllers in order to provide network connectivity to client devices associated with the APs of the computing network. The various types of controllers can provide redundancy for network connections of the APs of the computing network.

As used herein, the term "access point (AP)", can, for example, refer to a networking device that allows a client device to connect to a wired or wireless network. An AP can include a processor, memory, and input/output interfaces, including wired network interfaces such as IEEE 802.3 Ethernet interfaces, as well as wireless network interfaces such as IEEE 802.11 WLAN interfaces, although examples of the disclosure are not limited to such interfaces. An AP can include memory, including read-write memory, and a hierarch of persistent memory such as ROM, EPROM, and Flash memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, the term "client device" can, for example, refer to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

The controllers can manage a set of APs in the network. In an event of a controller failure, full redundancy of the APs of the network may not be possible. For example, in a computing network including four controllers, the maximum number of APs that can be used with full redundancy is 1,024. For example, 256 active APs and 256 standby APs can be utilized per controller. When all four controllers are functioning, all of the APs can provide network connectivity to their associated client devices.

In an event of a controller failure, full redundancy is no longer possible. For example, in the event of a controller failure, certain APs may lose a standby controller assignment, as the operational capacity of the three functioning controllers may be exhausted.

In an event in which another controller fails, the APs which do not have the standby controller assignment assigned can internally rebootstrap. As used herein, the term "rebootstrap" can, for example, refer to re-establishing, by an AP, a link to a controller, including configuring access point settings corresponding to the controller in order to begin transmitting beacons. Having an AP have to rebootstrap can cause significant network downtime for client devices associated with the AP. During this time, the client devices may not be provided with network connectivity.

Standby controllers for APs, according to the disclosure, can allow for redundancy in the event of a controller failure. A network controller can re-assign standby controller assignments for APs in the event of a first controller failure. The APs can be reassigned to other controllers such that, in the event of a second controller failure, significant radio frequency (RF) gaps do not occur. By preventing RF gaps from occurring, client devices can connect to other nearby APs in order to maintain network connectivity in the event of controller failure of the computing network.

Figure 1:
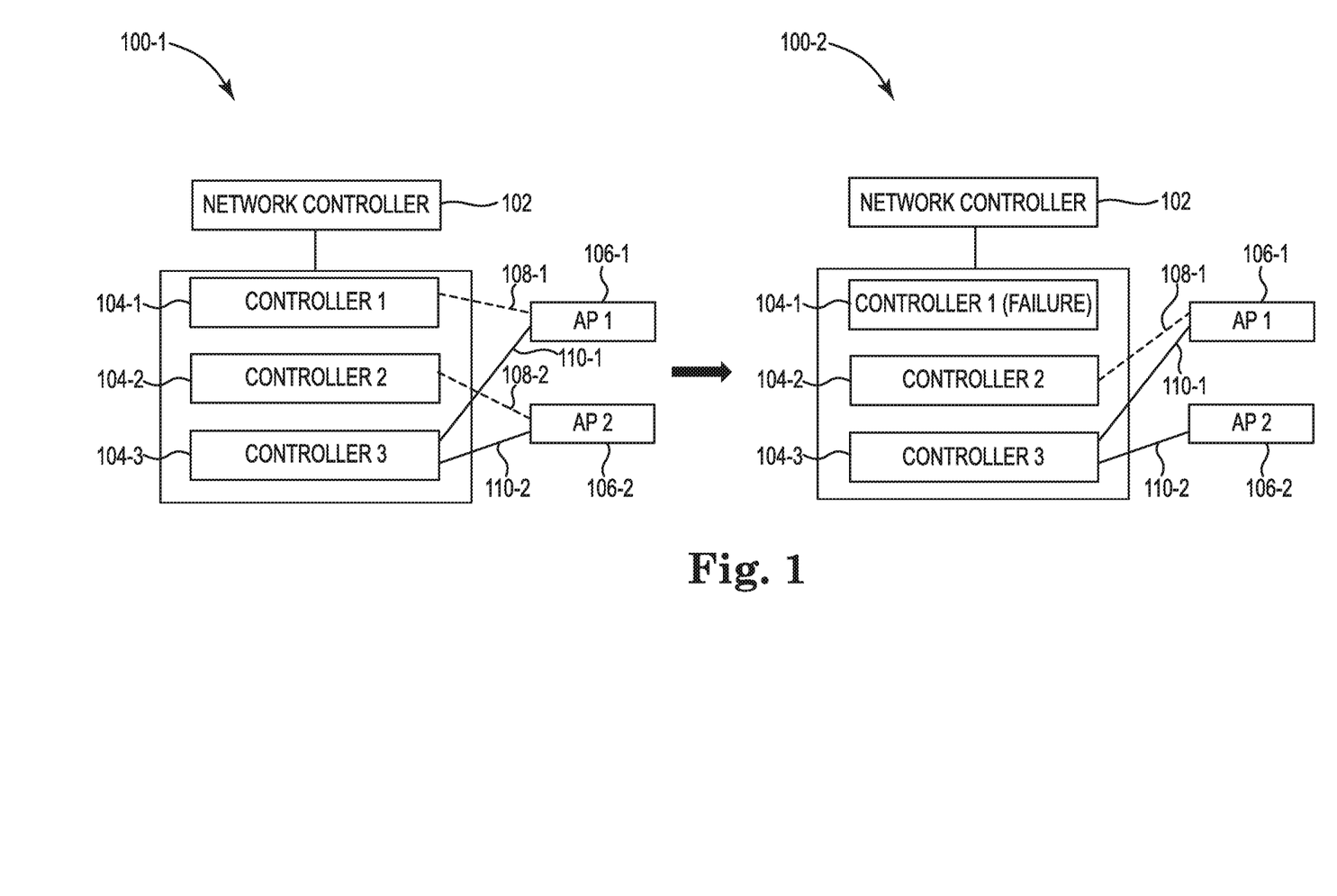
FIG. 1 illustrates an example network layout consistent with the disclosure.

FIG. 1 illustrates an example network layout 100-1 and 100-2 consistent with the disclosure. As illustrated in FIG. 1, the network layout 100-1 can include network controller 102, controllers 1-3 (104-1, 104-2, 104-3, respectively), APs 1 and 2 (106-1, 106-2, respectively), standby controller assignment 108-1, 108-2, and active controller assignment 110-1, 110-2. As illustrated in network layout 100-1 in FIG. 1, network controller 102 can control controllers 104-1, 104-2, 104-3. Network layout 100-2 can include network controller 102, controller 1 (104-1) as having failed and operational controllers 2-3 (104-2, 104-3, respectively), APs 1 and 2 (106-1, 106-2, respectively), standby controller assignment 108-1, and active controller assignment 110-1, 110-2. Similar to network layout 100-1, as illustrated in network layout 100-2, network controller 102 can control controllers 104-1, 104-2, 104-3.

As illustrated in FIG. 1, network layout 100-1 can include AP 106-1 (e.g., first AP) and AP 106-2 (e.g., second AP). AP 106-1 and AP 106-2 can include standby controller assignments 108-1 and 108-2, respectively, and active controller assignments 110-1 and 110-2, respectively. As used herein, the term "active controller" can, for example, refer to a controller which can manage a set of APs in a network, where the APs can be connected to the controller such that the controller can provide network connectivity to client devices associated with the APs. As used herein, the term "active controller assignment" can, for example, refer to the particular active controller to which a particular AP is appointed. As used herein, the term "standby controller"

can, for example, refer to a controller which can manage a set of APs in a network, where the APs can connect to the controller in the event that the active controller assigned to manage the particular AP fails such that the standby controller can provide network connectivity to client devices associated with the APs. As used herein, the term "standby controller assignment" can, for example, refer to the particular standby controller to which a particular AP is appointed.

For example, as illustrated in FIG. 1, AP 106-1 can correspond to a standby controller assignment 108-1 to controller 104-1 and an active controller assignment 110-1 to controller 104-3. AP 106-2 can correspond to a standby controller assignment 108-2 to controller 104-2 and an active controller assignment 110-2 to controller 104-3. Based on the above assignments, AP 106-1 can provide network connectivity to client devices associated with AP 106-1 via controller 104-3 and AP 106-2 can provide network connectivity to client devices associated with AP 106-2 via controller 104-3. Further, in the event controller 104-3 fails, AP 106-1 can provide network connectivity to client devices associated with AP 106-1 via controller 104-1 and AP 106-2 can provide network connectivity to client devices associated with AP 106-2 via controller 104-2. As used herein, the term "fail" can, for example, refer to a transition of a controller from a working condition to a non-working condition. For instance, a controller that has failed can have gone from a condition in which the controller was providing network connectivity to client devices associated with an AP connected to the controller to a condition in which the controller is no longer providing network connectivity to the client devices.

As illustrated in FIG. 1, network layout 100-2 can include controller 104-1. In network layout 100-2, controller 104-1 has failed. For example, controller 104-1 is no longer providing network access to APs connected to controller 104-1. For instance, although not illustrated in FIG. 1 for clarity and so as not to obscure examples of the disclosure, a different AP may include an active controller assignment to controller 104-1. As a result of controller 104-1 failing, controller 104-1 can no longer provide network connectivity to client devices of the other AP.

Network controller 102 can determine, in response to controller 104-1 failing, whether AP 106-1 has a corresponding standby controller assignment. For example, as shown in network layout 100-1, AP 106-1 includes a standby controller assignment 108-1 to controller 104-1. However, as a result of controller 104-1 failing (e.g., shown in network layout 100-2), AP 106-1 loses the standby controller assignment 108-1 to controller 104-1. Network controller 102 can determine that, as a result of controller 104-1 failing, AP 106-1 no longer has a corresponding standby controller assignment. Therefore, in the event that controller 104-3, to which AP 106-1 has an active controller assignment 110-1, were to fail, AP 106-1 would not have a backup controller to connect to. AP 106-1 would have to rebootstrap, and client devices connected to AP 106-1 may lose network connectivity.

Network controller 102 can detect the failure of controller 104-1 and determine, in response to AP 106-1 not having a corresponding standby controller assignment, a size of a radio frequency (RF) gap if a different controller were to fail. For example, network controller 102 can determine a size of an RF gap if controller 104-3 were to fail. As used herein, the term "RF" can, for example, refer to electromagnetic wave frequencies in various ranges. As used herein, the term "RF gap" can, for example, refer to a gap in coverage of various electromagnetic wave frequencies.

For example, the network layout 100 illustrated in FIG. 1 can utilize AP 106-1 to provide network connectivity to devices in a certain geographic area, and AP 106-2 can provide network connectivity to devices in a different geographic area. AP 106-1 can send and receive RF signals (e.g., RF waves) at specified frequencies in order to provide network connectivity to client devices associated with the AP in the certain geographic area. As illustrated in network layout 100-2, if controller 104-3 were to fail, AP 106-1 would lose network connectivity, since AP 106-1 includes an active controller assignment to controller 104-3. As a result, client devices in the geographic area served by AP 106-1 would lose network connectivity as a result of controller 104-3 failing.

in some examples, network controller 102 can determine the size of the RF gap based on RF coverage of APs managed by different controllers located near AP 106-1. For example, as illustrated in network layout 100-2, if controller 104-3 were to fail, AP 106-1 would lose network connectivity. Network controller 102 can look to other APs located near AP 106-1 to determine the RF coverage of those APs. For example, network controller 102 can look to AP 106-2 to determine the RF coverage of AP 106-2. Based on the RF coverage that would be lost if AP 106-1 were to lose network connectivity, and based on the RF coverage that AP 106-2 can provide, network controller 102 can determine a size of the RF gap that would be created if AP 106-2 were to lose network connectivity as a result of controller 104-3 failing.

In some examples, network controller 102 can determine the size of the RF gap based on selected channels of APs managed by different controllers located near AP 106-1. For example, as illustrated in network layout 100-2, if controller 104-3 were to fail, AP 106-1 would lose network connectivity. Network controller 102 can look to other APs located near AP 106-1 to determine the channel of those APs near AP 106-1. Based on the RF coverage that would be lost if AP 106-1 were to lose network connectivity, and based on the channel that AP 106-2 is operating in, network controller 102 can determine a size of the RF gap that would be created if AP 106-2 were to lose network connectivity as a result of controller 104-3 failing.

For instance, network controller 102 can group APs of the computing network by channel. Network controller 102 can determine whether APs belonging to two different groups of channels with adjacent physical locations do not have a standby controller assigned. For example, network controller 102 can determine AP 106-1 is operating on a different channel from AP 106-2, where AP 106-1 does not have a standby controller assigned. Based on the APs belonging to two different groups of channels being adjacent and not having a standby controller assigned, network controller 102 can determine the size of the RF gap based on the selected channels of APs based on the grouping of APs by channels.

Based on the size of the RF gap, network controller 102 can remove controller 104-2 as the standby controller assignment for AP 106-2. For example, as illustrated in network layout 100-1, controller 104-2 is assigned as the standby controller assignment 108-2 for AP 106-2. Controller 104-2 can be at a threshold capacity due to the standby controller assignment 108-2 for AP 106-2.

As previously described above, as a result of controller 104-1 failing (e.g., as illustrated in network layout 100-2), AP 106-1 loses its previously assigned standby controller assignment 108-1 of controller 104-1. Based on the size of the RF gap, network controller 102 can remove the standby controller assignment 108-2 of AP 106-2 (e.g., as illustrated in network layout 100-1) so that AP 106-2 has an active controller assignment 110-2 with controller 104-3, but not a standby controller assignment. Removing the standby controller assignment 108-2 of AP 106-2 can free capacity in controller 104-2.

Network controller 102 can assign controller 104-2 as the standby controller assignment 108-1 for AP 106-1. For example, as a result of controller 104-1 failing, network controller 102 can assign controller 104-2 as the standby controller assignment 108-1 for AP 106-1 so that, in the event that controller 104-3 were to fail, AP 106-1 could provide network connectivity to client devices associated with AP 106-1 via controller 104-2 as a result of the standby controller assignment 108-1 for AP 106-1.

Although not illustrated in FIG. 1 for clarity and so as not to obscure examples of the disclosure, in some examples, AP 106-2 can include a standby controller assignment to a controller not illustrated in FIG. 1. Therefore, in the event that controller 104-3 were to fail, AP 106-2 can provide network connectivity to client devices associated with AP 106-2 as a result of the standby controller assignment to the controller not shown in FIG. 1, and AP 106-1 can provide network connectivity to client devices associated with AP 106-1 as a result of the standby controller assignment 108-1 to controller 104-2.

Although not illustrated in FIG. 1 for clarity and so as not to obscure examples of the disclosure, in some examples, AP 106-2 does not have a standby controller assignment to a controller. For example, network controller 102 can determine that, if controller 104-3 were to fail, the RF gap created by AP 106-2 would not be significant enough that client devices associated with AP 106-2 would lose network connectivity, as is further described in connection with FIGS. 2A and 2B. For example, client devices associated with AP 106-2 could re-associate with another AP located proximate to AP 106-2 (e.g., AP 106-1). AP 106-1 can provide network connectivity to client devices associated with AP 106-1 as a result of the standby controller assignment 108-1 to controller 104-2.

In some examples, network controller 102 can assign controller 104-2 as the standby controller assignment 108-1 for AP 106-1 in response to the size of the determined RF gap exceeding a threshold RF gap. The threshold RF gap can be a gap in RF coverage that would result in a loss of network connectivity for client devices associated with an AP that loses network connectivity because the client devices are unable to associate with a different AP because, for example, the different AP may be too geographically remote. For example, the network controller 102 can determine the RF gap created if controller 104-3 were to fail would not allow for client devices to associate with different APs exceeds a threshold RF gap. As a result of the RF gap exceeding a threshold RF gap, network controller 102 can assign controller 104-2 as the standby controller assignment 108-1 for AP 106-1.

As illustrated in network layout 100-2, if controller 104-2 were to fail, controller 104-3 can provide network connectivity to client devices associated with AP 106-1 as a result of the active controller assignment 110-1 to controller 104-3. Additionally, controller 104-3 can provide network connectivity to client devices associated with AP 106-2 as a result of the active controller assignment 110-2 to controller 104-3.

Figure 2A:
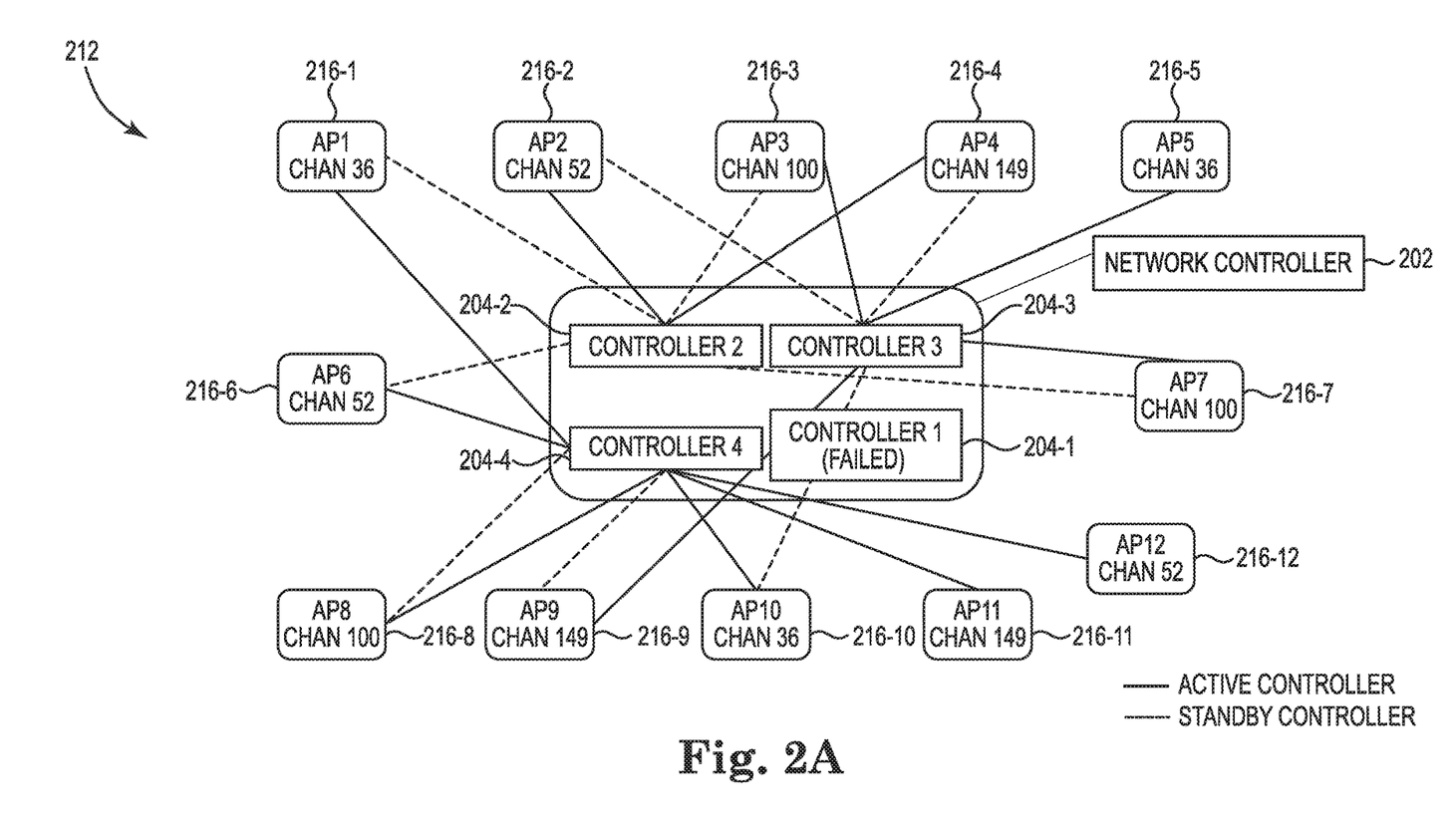
FIG. 2A illustrates an example network layout consistent with the disclosure.

FIG. 2A illustrates an example network layout 212 consistent with the disclosure. As illustrated in FIG. 2A, network layout 212 can include network controller 202, failed controller 204-1, controllers 204-2, 204-3, 204-4, and APs 216-1 through 216-12. As illustrated in FIG. 2A, network controller 202 can control controllers 204-2, 204-3, 204-4.

As illustrated in FIG. 2A, APs 216-1 through 216-12 can include active controller assignments (e.g., illustrated as solid lines) and standby controller assignments (e.g., illustrated as dotted lines). For example, controller 204-2 can include active controller assignments for APs 216-2 and 216-4 and standby controller assignments for APs 216-1, 216-3, 216-6, and 216-7. Controller 204-3 can include active controller assignments for APs 216-3, 216-5, 216-7, and 216-9 and standby controller assignments for APs 216-2, 216-4, and 216-10. Controller 204-4 can include active controller assignments for APs 216-1, 216-6, 216-8, 216-10, 216-11, and 216-2, and standby controller assignments for APs 216-8 and 216-9.

As illustrated in FIG. 2A, controller 204-1 has failed. As a result, active controller assignments and standby controller assignments for APs assigned to failed controller 204-1 can be different from active controller assignments and standby controller assignments for APs assigned to operational controller 204-1. For example, prior to controller 204-1 having failed, operational controller 204-1 can include active controller assignments for APs 216-5, 216-8, 216-9, and standby controller assignments for APs 216-7, 216-10, 216-11, and 216-12. In other words, as a result of controller 204-1 failing, AP 216-5 was reassigned with an active controller assignment to controller 204-3, AP 216-8 was reassigned with an active controller assignment to controller 204-4, AP 216-9 was reassigned with an active controller assignment to controller 204-3, AP 216-7 was reassigned with a standby controller assignment to controller 204-2, AP 216-10 was reassigned with a standby controller assignment to controller 204-3, and APs 216-5, 216-11, and 216-12 no longer have a standby controller assignment. APs 216-8 and 216-9 can be reassigned with a standby controller assignment to controller 204-4 as a result of controller 204-4 not being at an operational capacity.

As a result of the reassignments of active controllers and standby controllers, controllers 204-2, 204-3, and 204-4 may be at an operational capacity. Therefore, in the event that another controller fails (e.g., controller 204-4), APs 216-11 and 216-12 may rebootstrap, since APs 216-11 and 216-12 no longer include a standby controller assignment. APs 216-11 and 216-12 rebootstrapping can cause an interruption in network connectivity to client devices associated with APs 216-11 and 216-12. To avoid rebootstrapping, network controller 202 can re-assign standby controllers to APs 216-11 and 216-12, as is further described with respect to FIG. 2B.

Figure 2B:
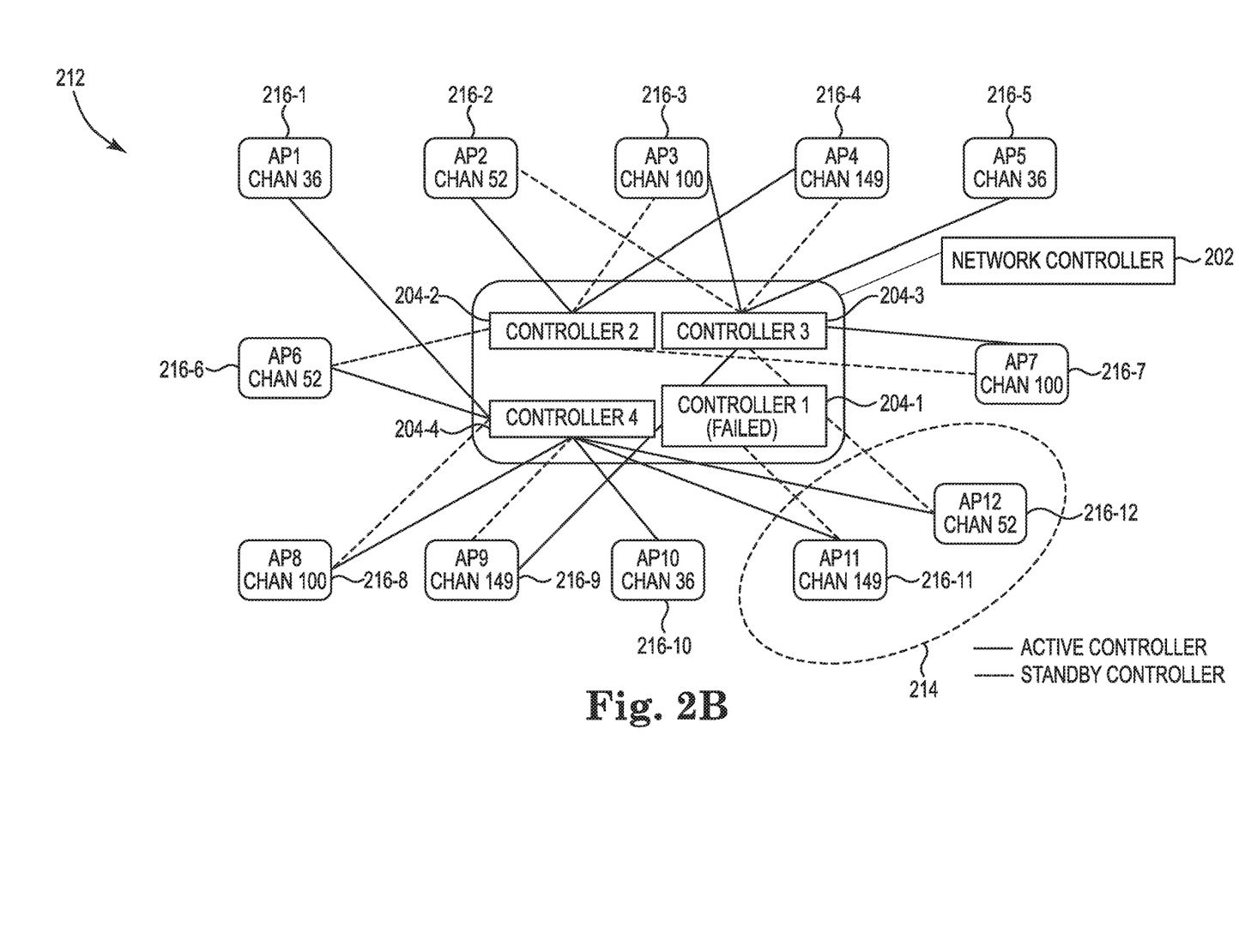
FIG. 2B illustrates an example network layout consistent with the disclosure.

FIG. 2B illustrates an example network layout 212 consistent with the disclosure. As illustrated in FIG. 2B, network layout 212 can include network controller 202, failed controller 204-1, controllers 204-2, 204-3, 204-4, APs 216-1 through 216-12, and RF gap 214. As illustrated in FIG. 2B, network controller 202 can control controllers 204-2, 204-3, 204-4.

As previously described in connection with FIG. 2A, APs 216-1 through 216-12 can include respective active controller assignments and APs 216-1 through 216-10 can include standby controller assignments. As a result of controller 204-1 failing, network controller 202 can determine a status of standby controller assignments of APs managed by controller 204-1. For example, network controller 202 can determine a status of standby controller assignments of APs 216-7, 216-10, 216-11, and 216-12 (e.g., since APs 216-7, 216-10, 216-11, and 216-12 included standby controller assignments to controller 204-1 prior to controller 204-1 failing, as previously described in connection with FIG. 2A).

Network controller 202 can determine AP 216-7 includes a standby controller assignment to controller 204-2. However, network controller 202 can determine APs 216-10, 216-11, and 216-12 no longer include standby controller assignments, as illustrated in FIG. 2B. AP 216-10, 216-11, and 216-12 still include active controller assignments to controller 204-4.

Network controller 202 can determine, based on APs 216-10, 216-11, and 216-12 no longer include standby controller assignments, a size of RF gap 214 if a different controller were to fail. For example, network controller 202 can determine the size of RF gap 214 that would result if controller 204-4 failed and caused AP 216-10, 216-11, and 216-12 to lose network connectivity.

For example, network controller 202 can determine the size of RF gap 214 based on RF coverage of APs managed by different controllers located near APs 216-10, 216-11, and 216-12. For example, if controller 204-4 were to fail, network controller can determine that AP 216-9 can provide RF coverage to client devices associated with AP 216-10 since AP 216-9 is located geographically close to AP 216-10 and the RF coverage of AP 216-9 can cover client devices associated with AP 216-10.

However, network controller 202 can determine that AP 216-7 is not able to provide RF coverage to client devices associated with AP 216-12, since AP 216-7 is not located geographically close enough to AP 216-12 such that the RF coverage of AP 216-7 cannot cover client devices associated with AP 216-12. Further, since APs 216-10 and 216-12 would lose network connectivity if controller 204-4 were to fail, there are no APs located near AP 216-11 to provide RF coverage to client devices associated with AP 216-11. As a result, network controller 202 can determine the size of RF gap 214 that would result if controller 204-4 were to fail. In other words, there are no APs located near AP 216-11 to provide RF coverage to client devices associated with AP 216-11 and AP 216-7 is located too far away geographically to cover client devices associated with AP 216-12, resulting in RF gap 214 being created if controller 204-4 were to fail.

Network controller 202 can determine that the size of RF gap 214 exceeds a threshold RF gap size. The threshold RF gap can be a gap in RF coverage that would result in a loss of network connectivity for client devices associated with an AP that loses network connectivity because the client devices are unable to associate with different APs because, for example, the different APs (e.g., APs 216-7 and/or 216-9) may be too geographically remote.

In response to the size of RF gap 214 exceeding the threshold RF gap size, network controller 202 can remove controller 204-2 as a standby controller assignment for AP 216-1. Removing the standby controller assignment for AP 216-1 from controller 204-4 can create assignment capacity in controller 204-2 such that a standby controller assignment for a different AP can be made.

Network controller 202 can assign controller 204-2 as a standby controller assignment for AP 216-11. For example, removal of the standby controller assignment of controller 204-2 for AP 216-1 can allow for assignment capacity to be used by AP 216-11. In an event in which controller 204-4 fails, AP 216-11 can continue to provide network connectivity to client devices associated with AP 216-11, and in some examples, AP 216-11 can additionally provide network connectivity to client devices associated with AP 216-10.

Network controller 202 can determine, in response to controller 204-1 coming back online, a status of standby controller assignments of APs 216-1 through 216-12. For example, controller 204-1 may come back online after being rebooted, being fixed, replaced, etc. As a result, network controller 202 can determine the status of standby controller assignments of APs 216-1 through 216-12.

As illustrated in FIG. 2B, network controller 202 can determine AP 216-1, 216-5, and 216-10 do not include standby controller assignments. As previously described above, network controller 202 can determine a size of an RF gap that would result if, for example, controller 204-3 were to fail causing AP 216-5 to lose network connectivity, or controller 204-2 were to fail, etc. Network controller 202 can assign a controller (e.g., controller 204-1) as a standby controller assignment to APs that do not have a standby controller assignment in response to controller 204-1 coming back online. For example, network controller 202 can assign controller 204-1 as a standby controller assignment to AP 216-1, 216-5, and 216-10.

In some examples, network controller 202 can reassign controller 204-1 as an active controller assignment for APs which were previously assigned to controller 204-1 prior to first controller 204-1 failing in response to controller 204-1 coming back online. For example, network controller 202 can assign controller 204-1 as an active controller assignment for APs 216-5, 216-8, and 216-9.

Although network controller 202 is described above as re-assigning active controller and standby controller assignments for a computing network including a controller cluster having four controllers and an amount of APs, examples of the disclosure are not so limited. For example, the controller cluster of the computing network can include less than four controllers with an amount of APs, and/or more than four controllers with an amount of APs.

Standby controllers for APs, according to the disclosure, can prevent APs from rebootstrapping in an event of a controller failure. Preventing APs from rebootstrapping can prevent loss of network connectivity for client devices associated with APs assigned to the failed controller.

Figure 3:
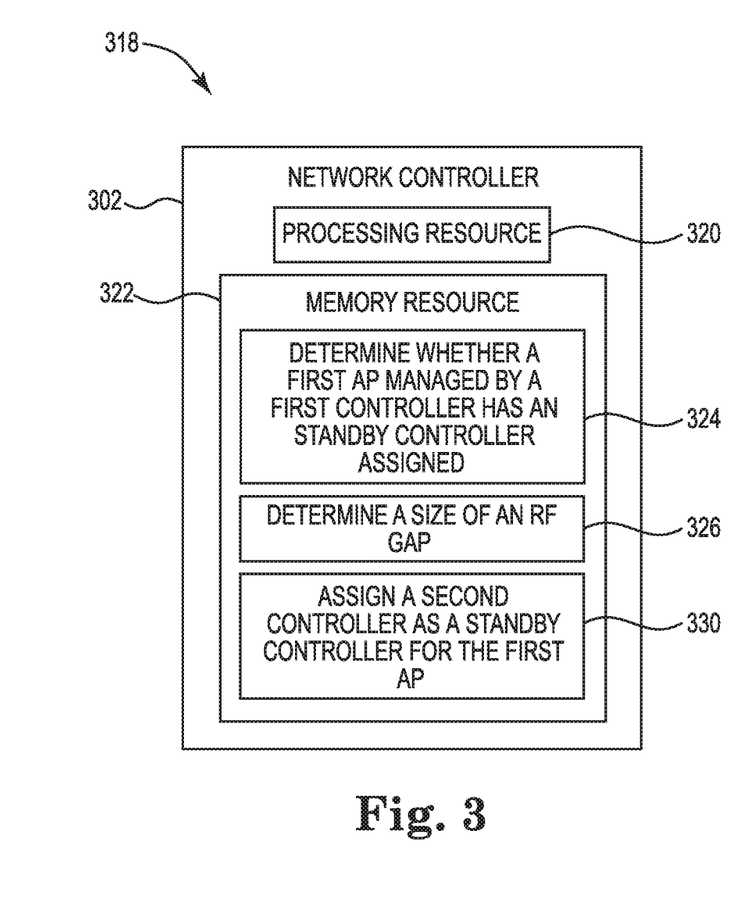
FIG. 3 is a block diagram of an example network controller or standby controllers for access points consistent with the disclosure.

FIG. 3 is a block diagram 318 of an example network controller 302 for standby controllers for access points consistent with the disclosure. As described herein, the network controller 302 may perform a number of functions related to standby controllers for access points. Although not illustrated in FIG. 3, the network controller 302 may include a processor and a machine-readable storage medium. Although the following descriptions refer to a single processor and a single machine-readable storage medium, the descriptions may also apply to a system with multiple processors and multiple machine-readable storage mediums. In such examples, the network controller 302 may be distributed across multiple machine-readable storage mediums and the network controller 302 may be distributed across multiple processors. Put another way, the instructions executed by the network controller 302 may be stored across multiple machine-readable storage mediums and executed across multiple processors, such as in a distributed or virtual computing environment.

As illustrated in FIG. 3, the network controller 302 may comprise a processing resource 320, and a memory resource 322 storing machine-readable instructions to cause the processing resource 320 to perform a number of operations relating to standby controllers for access points. That is, using the processing resource 320 and the memory resource 322, the network controller 302 may assign standby controller assignments to APs, among other operations. Processing resource 320 may be a central processing unit (CPU), microprocessor, and/or other hardware device suitable for retrieval and execution of instructions stored in memory resource 322.

The network controller 302 may include instructions 324 stored in the memory resource 322 and executable by the processing resource 320 to determine whether a first AP managed by a first controller has a standby controller assigned. That is, the network controller 302 may include instructions 324 stored in the memory resource 322 and executable by the processing resource 316 to determine, in response to a first controller failing, whether a first AP managed by the first controller has a standby controller assigned. The first AP may no longer have a standby controller assigned as a result of the failure of the first controller.

The network controller 302 may include instructions 326 stored in the memory resource 322 and executable by the processing resource 320 to determine a size of an RF gap. That is, the network controller 302 may include instructions 326 stored in the memory resource 322 and executable by the processing resource 316 to determine, in response to the first AP managed by the first controller not having a standby controller assigned, a size of an RF gap as a result of a different controller failing. For example, the first AP may include an active controller assignment to a second controller. If the second controller were to fail, network controller 302 can determine the size of the RF gap that would result if first AP lost network connectivity as a result of the second controller failing.

The network controller 302 may include instructions 330 stored in the memory resource 322 and executable by the processing resource 320 to assign a second controller as a standby controller for the first AP. That is, the network controller 302 may include instructions 330 stored in the memory resource 322 and executable by the processing resource 316 to assign a second controller as a standby controller for the first AP based on the size of the RF gap. Network controller 302 can remove the second controller as a standby controller for a second AP and, in response to the size of the RF gap being greater than a threshold RF gap, assign the second controller as a standby controller for the first AP.

In this manner, the network controller 302 may assign standby controllers to APs in the event that a controller fails. Using these assigned standby controllers can prevent interruptions in network connectivity in an event in which another controller fails.

Figure 4:
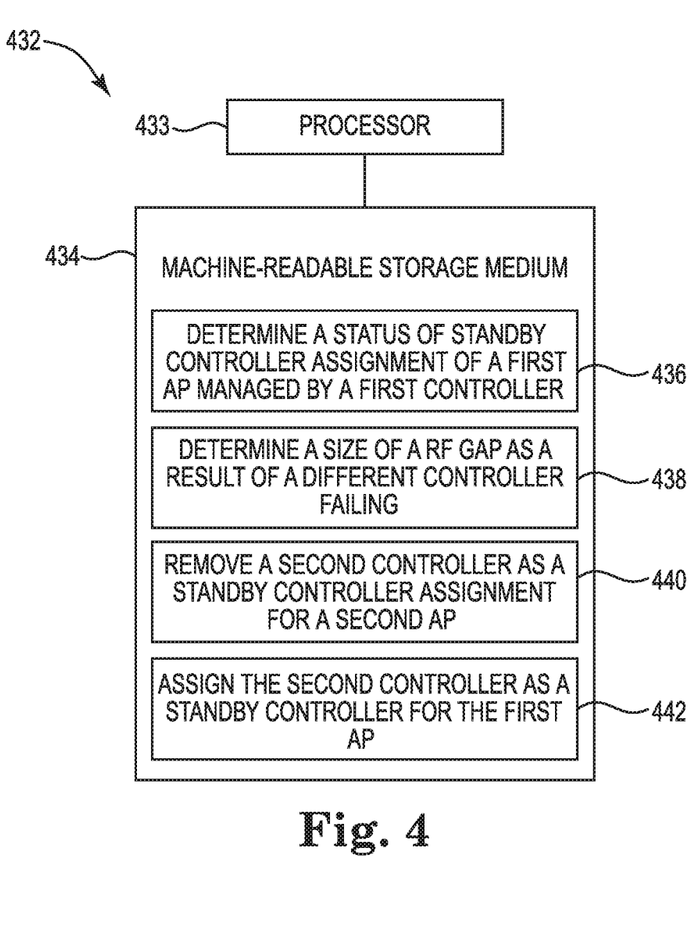
FIG. 4 is a block diagram of an example system consistent with the disclosure.

FIG. 4 is a block diagram of an example system 432 consistent with the disclosure. In the example of FIG. 4, system 432 includes a processor 433 and a machine-readable storage medium 434. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 433 may be a central processing unit (CPU), microprocessor, and/or other hardware device suitable for retrieval and execution of instructions stored in machine-readable storage medium 434. In the particular example shown in FIG. 4, processor 433 may receive, determine, and send instructions 436, 438, 440, and 442. As an alternative or in addition to retrieving and executing instructions, processor 433 may include an electronic circuit comprising a number of electronic components for performing the operations of the instructions in machine-readable storage medium 434. With respect to the executable instruction representations or boxes described and shown herein, it should be understood that part or all of the executable instructions and/or electronic circuits included within one box may be included in a different box shown in the figures or in a different box not shown.

Machine-readable storage medium 434 may be any electronic, magnetic, optical, or other physical storage device that stores executable instructions. Thus, machine-readable storage medium 434 may be, for example, Random Access Memory (RAM), an Electrically-Erasable Programmable Read-Only Memory (EEPROM), a storage drive, an optical disc, and the like. The executable instructions may be "installed" on the system 432 illustrated in FIG. 4. Machine-readable storage medium 434 may be a portable, external or remote storage medium, for example, that allows the system 432 to download the instructions from the portable/external/remote storage medium. In this situation, the executable instructions may be part of an "installation package". As described herein, machine-readable storage medium 434 may be encoded with executable instructions for standby controllers for access points.

Determine a status of a standby controller assignment of a first AP managed by a first controller instructions 436, when executed by a processor such as processor 433, may cause system 432 to determine, in response to the first controller failing, a status of standby controller assignment of the first AP managed by the first controller. The first controller can be assigned as a standby controller for the first AP prior to the first controller failing, and a third controller can be assigned as an active controller for the first AP. However, the first AP may no longer have a standby controller assigned as a result of the failure of the first controller.

Determine a size of a RF gap as a result of a different controller failing instructions 438, when executed by a processor such as processor 433, may cause system 432 to determine, based on the first AP managed by the first controller not having a standby controller assigned as a result of the first controller having failed, a size of a RF gap as a result of a different controller failing. For example, the first AP has an active controller assignment to a third controller, and had a standby controller assignment to the first controller prior to the first controller failing. Since the first AP no longer includes a standby controller assignment to the first controller, if the third controller were to fail, an RF gap would result. The network controller can determine the size of the resulting RF gap if first AP lost network connectivity as a result of the second controller failing.

Remove a second controller as a standby controller assignment for a second AP instructions 440, when executed by a processor such as processor 433, may cause system 432 to remove the second controller as a standby controller assignment for the second AP in response to the size of the determined RF gap exceeding a threshold RF gap. For example, the determined RF gap may be large enough such that APs neighboring the first AP may not be able to provide network connectivity to client devices associated with the first AP. As a result, the network controller can remove the second controller as a standby controller assignment for the second AP, freeing operational capacity for the second AP.

Assign the second controller as a standby controller for the first AP instructions 442, when executed by a processor such as processor 433, may cause system 432 to assign the second controller as a standby controller for the first AP in response to the size of the determined RF gap exceeding a threshold RF gap. For example, the network controller can utilize the operational capacity freed by removing the second controller as a standby controller assignment for the second AP by assigning the second controller as a standby controller for the first AP.

Figure 5:
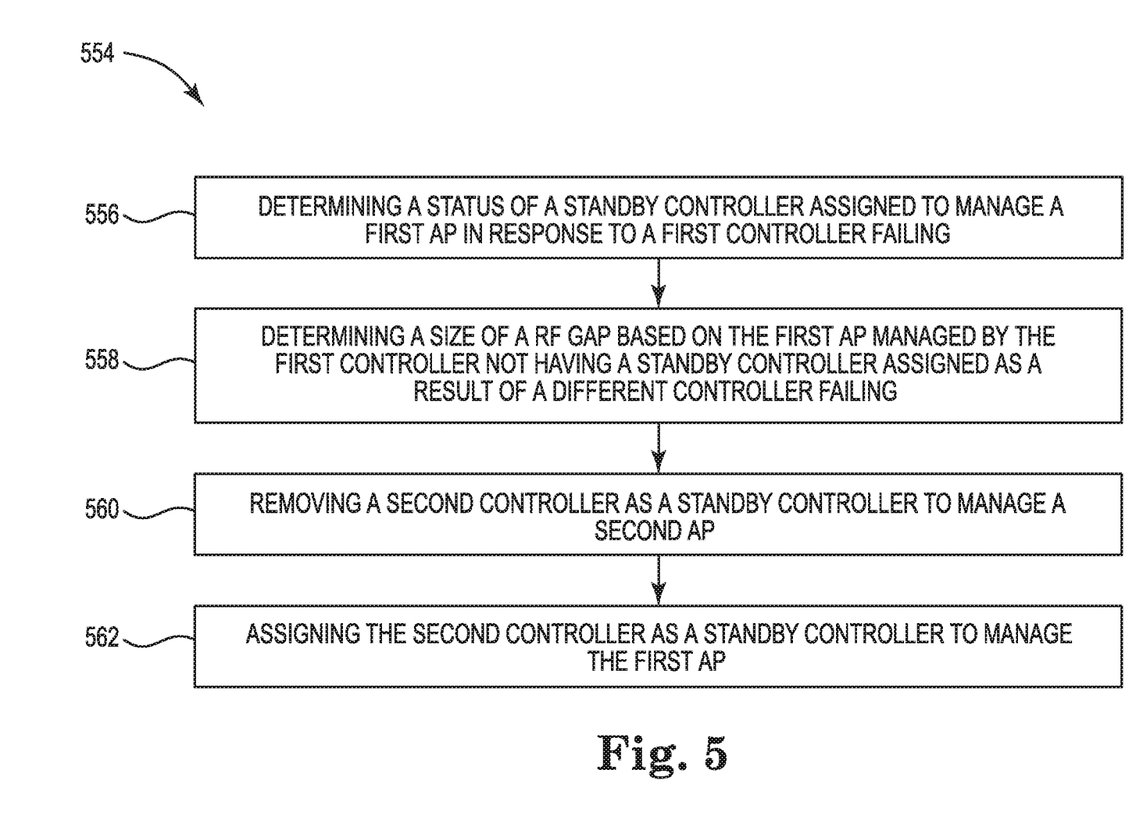
FIG. 5 illustrates an example method consistent with the disclosure.

FIG. 5 illustrates an example method 554 consistent with the disclosure. Method 554 may be performed, for example, by a network controller (e.g., network controller 102, 202, 302, previously described in connection with FIGS. 1-3, respectively).

At 556, the method 554 may include determining a status of a standby controller assigned to manage a first AP in response to a first controller failing. For example, a network controller can determine whether a first AP has a standby controller assignment in response to a first controller failing. For instance, the first controller can include a standby controller assignment for the first AP and a third controller can include an active controller assignment for the first AP. The network controller can determine that the first controller has failed. The network controller can determine that the first AP still has an active controller assigned to the third controller, but the first AP no longer has a standby controller assigned to manage the first controller as a result of the first controller failing.

At 558, the method 554 may include determining a size of a RF gap based on the first AP managed by the first controller not having a standby controller assigned as a result of a different controller failing. For example, the first AP has an active controller assignment to a third controller, and had a standby controller assignment to the first controller prior to the first controller failing. Since the first AP no longer includes a standby controller assignment to the first controller, if the third controller were to fail, an RF gap could result.

In some examples, the method 554 can include determining the size of the RF gap based on RF coverage of APs located near the first AP, where the APs located near the first AP are managed by different controllers. For example, APs located near the first AP may not have lost a standby controller assignment, and the network controller can determine the size of the RF gap based on whether the APs located near the first AP are able to absorb client devices associated with the first AP. For instance, if the APs located near the first AP are able to absorb client devices associated with the first AP, the RF gap would be smaller than if the APs located near the first AP are unable to absorb client devices associated with the first AP if the third controller were to fail.

At 560, the method 554 can include removing a second controller as a standby controller to manage a second AP. For example, the determined RF gap may be large enough such that APs neighboring the first AP may not be able to provide network connectivity to client devices associated with the first AP. As a result, the network controller can remove the second controller as a standby controller to manage the second AP, freeing operational capacity for the second AP.

At 562, the method 554 can include assigning the second controller as a standby controller to manage the first AP. For example, the network controller can utilize the operational capacity freed by removing the second controller as a standby controller assignment for the second AP by assigning the second controller as a standby controller to manage the first AP. By assigning the second controller as a standby controller to manage the first AP, the second controller can provide network connectivity to the first AP in the event that the third controller fails after the first controller failed.

The method 554 can include determining, by the first AP, the third controller having the active controller assignment for the first AP has failed such that the third controller no longer provides network connectivity to client devices associated with the first AP. For example, if the third controller having the active controller assignment for the first AP fails, the third controller can no longer provide network connectivity to the first AP. However, the second controller can provide network access to the first AP, as is further described herein.

The method 554 can include providing, by the second controller, network connectivity to the client devices associated with the first AP in response to the third controller failing. The second controller can provide network connectivity as a result of the second controller having the standby controller assignment for the first AP, as described above.

In some examples, the method 554 can include refraining, by the network controller from removing the second controller as the standby controller assignment for the second AP and assigning the second controller as the standby controller for the first AP if the first AP has a standby controller assigned to it when the first controller fails. For example, if the first AP were to have an active controller assigned to the third controller, and had a standby controller assigned to a fourth controller, the first AP would not lose the standby controller assignment assigned to the fourth controller if the first controller were to fail.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A network controller comprising:
a processing resource; and
a memory resource storing machine-readable instructions executable by the processing resource to cause the processing resource to:
    determine, in response to a first controller in a controller cluster failing, that a first access point (AP) to which the first controller was assigned as a standby controller has not been assigned to a new standby controller after failure of the first controller;
    in response to determining that the first AP does not have the new standby controller assigned, determine a size of a radio frequency (RF) gap that would result from the first AP losing network connectivity due to a second controller in the controller cluster failing, the second controller being actively assigned to the first AP, the size determination being based at least in part on RF coverage of one or more other APs that would continue to maintain network connectivity after the second controller fails; and based on the size of the RF gap;
remove assignment of a third controller of the controller cluster as a standby controller for a second AP, wherein the third controller is currently operational; and
assign the third controller as the new standby controller for the first AP.

2. The network controller of claim 1, including instructions to determine the size of the RF gap based at least in part on a physical distance between the first AP and a third AP and the first AP and the third AP operating on different channels.

3. The network controller of claim 1, wherein a fourth controller of the controller cluster is assigned as an active controller to manage a third AP.

4. The network controller of claim 3, wherein the second controller is actively assigned to a fourth AP, the network controller further including instructions to:
determine that the fourth AP has no standby controller assignment after the first controller fails;
determine, based at least in part on the fourth AP having no standby controller assignment, that the fourth AP would lose network connectivity due to the second controller failing;
determine that the third AP would be able to provide sufficient RF coverage to client devices managed by the fourth AP if the fourth AP loses network connectivity; and
determine that a new standby controller assignment is not needed for the fourth AP.

5. The network controller of claim 1, further including instructions to determine that the size of the RF gap exceeds a threshold gap size, wherein the removal of the assignment of the third controller as the standby controller for the second AP and assignment of the third controller as the new standby controller for the first AP is based on the size of the RF gap exceeding the threshold gap size.

6. The network controller of claim 1, further including instructions to transition the third controller from being the standby controller for the first AP to being a new active controller for the first AP responsive to the second controller failing, and wherein, after the second controller fails, the first AP provides, via the third controller, network connectivity to client devices managed by a third AP that lost network connectivity due to the second controller failing.

7. The network controller of claim 1, further including instructions to:
determine that the second controller is back online after failing;
determine that the second AP has no standby controller assignment; and
assign the second controller as a new standby controller for the second AP.

8. A non-transitory machine-readable medium storing instructions executable by a processing resource to:
determine, in response to a first controller in a controller cluster failing, that a first access point (AP) to which the first controller was assigned as a standby controller has not been assigned to a new standby controller after failure of the first controller;

in response to determining that the first AP does not have the new standby controller assigned, determine a size of a radio frequency (RF) gap that would result from the first AP losing network connectivity due to a second controller in the controller cluster failing, the second controller being actively assigned to the first AP, the size determination being based at least in part on RF coverage of one or more other APs that would continue to maintain network connectivity after the second controller fails; and based on the size of the RF gap;
remove assignment of a third controller of the controller cluster as a standby controller for a second AP, wherein the third controller is currently operational; and
assign the third controller as the new standby controller for the first AP.

9. The non-transitory machine-readable medium of claim 8, including instructions to determine the size of the RF gap based at least in part on a physical distance between the first AP and a third AP and the first AP and the third AP operating on different channels.

10. The non-transitory machine-readable medium of claim 8, wherein a fourth controller of the controller cluster is assigned as an active controller to manage a third AP.

11. The non-transitory machine-readable medium of claim 10, wherein the second controller is actively assigned to a fourth AP, further including instructions to:
determine that the fourth AP has no standby controller assignment after the first controller fails;
determine, based at least in part on the fourth AP having no standby controller assignment, that the fourth AP would lose network connectivity due to the second controller failing;
determine that the third AP would be able to provide sufficient RF coverage to client devices managed by the fourth AP if the fourth AP loses network connectivity; and
determine that a new standby controller assignment is not needed for the fourth AP.

12. The non-transitory machine-readable medium of claim 8, further including instructions to determine that the size of the RF gap exceeds a threshold gap size, wherein the removal of the assignment of the third controller as the standby controller for the second AP and assignment of the third controller as the new standby controller for the first AP is based on the size of the RF gap exceeding the threshold gap size.

13. The non-transitory machine-readable medium of claim 8, further including instructions to transition the third controller from being the standby controller for the first AP to being a new active controller for the first AP responsive to the second controller failing, and wherein, after the second controller fails, the first AP provides, via the third controller, network connectivity to client devices managed by a third AP that lost network connectivity due to the second controller failing.

14. The non-transitory machine-readable medium of claim 8, further including instructions to:
determine that the second controller is back online after failing;
determine that the second AP has no standby controller assignment; and
assign the second controller as a new standby controller for the second AP.

15. A method, comprising:
determining, in response to a first controller in a controller cluster failing, that a first access point (AP) to which the first controller was assigned as a standby controller has not been assigned to a new standby controller after failure of the first controller;
in response to determining that the first AP does not have the new standby controller assigned, determining a size of a radio frequency (RF) gap that would result from the first AP losing network connectivity due to a second controller in the controller cluster failing, the second controller being actively assigned to the first AP, the size determination being based at least in part on RF coverage of one or more other APs that would continue to maintain network connectivity after the second controller fails; and
based on the size of the RF gap;
removing assignment of a third controller of the controller cluster as a standby controller for a second AP, wherein the third controller is currently operational; and
assigning the third controller as the new standby controller for the first AP.

16. The method of claim 15, the method further comprising determining the size of the RF gap based at least in part on a physical distance between the first AP and a third AP and the first AP and the third AP operating on different channels.

17. The method of claim 15, wherein a fourth controller of the controller cluster is assigned as an active controller to manage a third AP.

18. The method of claim 17, wherein the second controller is actively assigned to a fourth AP, the method further comprising:
determining that the fourth AP has no standby controller assignment after the first controller fails;
determining, based at least in part on the fourth AP having no standby controller assignment, that the fourth AP would lose network connectivity due to the second controller failing;
determining that the third AP would be able to provide sufficient RF coverage to client devices managed by the fourth AP if the fourth AP loses network connectivity; and
determining that a new standby controller assignment is not needed for the fourth AP.

19. The method of claim 15, further comprising determining that the size of the RF gap exceeds a threshold gap size, wherein removing the assignment of the third controller as the standby controller for the second AP and assigning the third controller as the new standby controller for the first AP is based on the size of the RF gap exceeding the threshold gap size.

20. The method of claim 15, further comprising transitioning the third controller from being the standby controller for the first AP to being a new active controller for the first AP responsive to the second controller failing, and wherein, after the second controller fails, the first AP provides, via the third controller, network connectivity to client devices managed by a third AP that lost network connectivity due to the second controller failing.

* * * * *